April 15, 1930.  W. C. FISHER  1,754,233
FRICTION ELEMENT
Filed March 9, 1927
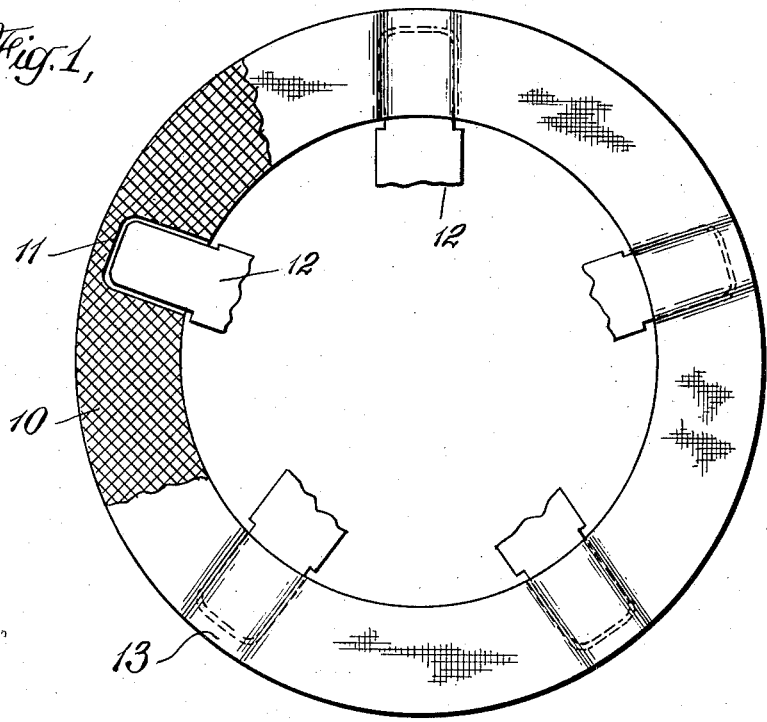
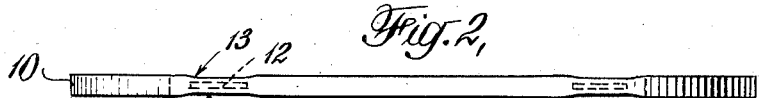
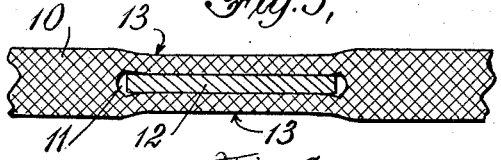
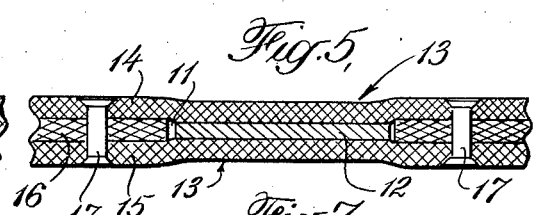
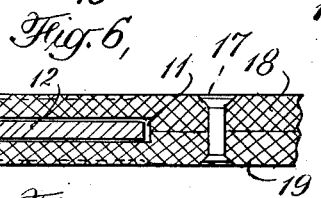
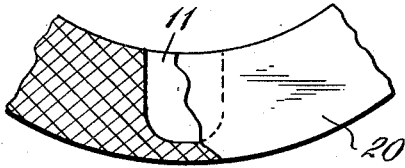
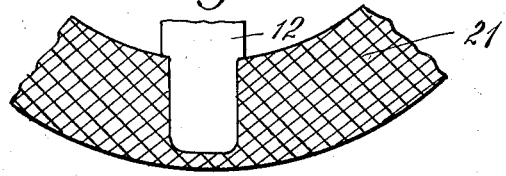
INVENTOR
William C. Fisher
BY
Pennie, Davis, Marvin & Edmonds
ATTORNEYS Patented Apr. 15, 1930

1,754,233

UNITED STATES PATENT OFFICE

WILLIAM C. FISHER, OF MIDDLETOWN, CONNECTICUT, ASSIGNOR TO RUSSELL MANUFACTURING COMPANY, OF MIDDLETOWN, CONNECTICUT, A CORPORATION OF CONNECTICUT

FRICTION ELEMENT

Application filed March 9, 1927. Serial No. 173,896.

This invention relates to friction clutches of the type now used in automobiles and other motor driven vehicles and is concerned more particularly with friction elements used in such clutches to effect the connection between the driving and driven members. In clutches as now commonly constructed for automobile installation, the fly wheel of the motor is used as the driving member and a friction element mounted on the propeller shaft transmits power thereto by being forced into engagement with a surface on the fly wheel. In most instances the friction element takes the form of a disc carrying a strip or ring of friction material and a presser plate is provided by which this friction ring may be forced into tight contact with the driving surface. The friction material is usually rigidly secured to the disc by rivets or other suitable means, and various materials, such as fibre, woven asbestos, and the like, are used for the purpose.

This arrangement of the clutch parts is unsatisfactory in service because the disc and the fly wheel are frequently thrown out of alignment due to the severe conditions under which they are operated. The friction material becomes worn in spots and frequent replacements are necessary. This involves the dismantling of the clutch and the removal and replacement of the friction ring. This is a costly and laborious operation and adds materially to the maintenance of the car. Also, dirt or grit frequently becomes lodged between the surface of the friction element and the coacting surface on the fly wheel, thus causing damage to the relatively soft friction element so that it wears rapidly.

The object of the present invention is to provide a clutch friction element which affords numerous advantages over friction elements as heretofore used. By the use of the new friction element, the cost of manufacture and maintenance of the clutch is decreased as accurate machining of the clutch parts now essential is greatly reduced and the friction element has a longer life and may be readily replaced when occasion arises. This friction element is so constructed that the friction ring which is flexible can readily conform to the surface of the fly wheel or the like, thereby compensating for manufacturing irregularities and providing a full contact. In addition, the friction ring is supported in place in such manner that it can yield or accommodate itself to misalignment of parts whenever occasion arises. The ring is furthermore constructed so as to be self-cleaning, thus eliminating wear arising from the presence of grit or dirt on the friction surface.

In the preferred form, the friction element consists of a ring of molded or woven friction material, either one-piece or laminated, provided with a series of pockets or channels preferably terminating within the outer periphery of the ring and adapted to receive spokes or other mounting members by which the ring is connected to the propeller shaft. This ring, though affording a good driving connection between the spokes of its mounting and the fly wheel or other driving member, is not mechanically connected to the spokes as by rivets or the like, and the pockets or channels are formed in such a manner that the ring is preferably of slightly decreased thickness at these channels, so that radial grooves are formed in its exterior surface. These grooves pick up dirt or grit which may collect on the driving face and the dirt is thrown outwardly by centrifugal action in the operation of the clutch. Owing to the manner in which the ring is mounted on the spokes, it may be readily removed and replaced whenever required.

I prefer to make the friction ring of fibrous friction material, such as woven asbestos fabric, or an asbestos material impregnated with suitable compounds so as to make a solid material of the type commonly known as "fibre". The woven type of ring may be made in the usual way, and in the process of weaving the pockets may be formed to receive the spokes on which it is to be mounted. Instead of making the ring in this manner, it may be made in two sections with grooves formed in the opposed faces to form pockets for the ends of the spokes. The two sections are then placed one on each side of the spokes and secured together by counter-sunk rivets or other suitable means, these rivets passing through the two sections but not through the spoke ends. The channels or pockets receive the spokes freely so that the ring can yield or accommodate itself to irregularities arising from misalignment of the parts, but the pockets afford a good driving connection between the ring and the spokes. Other forms of construction consist of three-ply structure of fabric or fibre, the center lamination being formed with spoke notches or made in sectors which form spoke channels between their ends when assembled, while another construction consists of a fibre ring molded over the ends of the spokes. For a better understanding of the invention reference is made to the accompanying drawings, in which Figure 1 is a face view, shown partially in section, of a woven fabric type of friction element;

Fig. 2 is an edge view of the same;

Fig. 3 is an enlarged section through the friction element and the end of the spoke;

Fig. 4 illustrates the three-ply form of friction element;

Fig. 5 is a section of the same through the end of the spoke;

Fig. 6 illustrates the two-ply form of friction element;

Fig. 7 is a face view of a molded element showing the spoke pocket; and

Fig. 8 illustrates a modification wherein the friction ring is molded on the ends of the spokes.

Referring to the drawings, Figs. 1 and 2 show a one piece two-ply fabric friction element 10, which is woven so as to form between plies pockets 11 opening into the interior periphery thereof and if desired terminating within the outer periphery. The ends of spokes 12 are adapted to be inserted in pockets 11 and their corners are preferably rounded so as to facilitate insertion. The circle of the spoke ends is somewhat less in diameter than the circle of the bottoms of pockets 11, so that a space remains between the ends of the spokes 12 and the bottoms of the pockets 11. As illustrated in Fig. 3, the length and width of pockets 11 are slightly greater than the width and thickness of spokes 12, thus permitting the ends of the spokes to enter the pockets freely. Accordingly, friction element 10 has a non-rigid connection with the spoke structure, permitting a slight movement of element 10 in any direction so as to be self-aligning as well as self-conforming with the surface of the fly-wheel. The element 10 is not mechanically secured to the spokes 12. The greater width of the pockets 11 over the thickness of the spokes 12 has the additional advantage that the sides of pockets 11 collapse against either side of spokes 12 to form radial depressions 13 in the surfaces of element 10, thereby dividing them into a plurality of wear surfaces. Whatever dirt or grit may become lodged between the fly-wheel surface and the surface of element 10 is accordingly carried by the initial slipping of the clutch into the depressions 13, from which it is subsequently ejected by the centrifugal force of rotation of the clutch. This self-cleaning action prevents the damage to the surface of the friction element, as the foreign matter is removed before it can be ground in.

Figs. 4 and 5 illustrate a friction element built up of ring-shaped discs of friction material. These discs may be made of friction fabric as illustrated, of molded friction material, or the like. The element consists of outer rings 14 and 15 disposed on either side of ring 16 and riveted together by rivets 17, the heads of which are counter-sunk below the surface of discs 14 and 15. As shown in Figs. 4 and 5, ring 16 is composed of a number of sectors so that a channel or pocket 11 is formed between the ends of adjacent sectors for the reception of spokes 12. Ring 16 may be formed out of one piece with pockets 11 cut out within the outer periphery of the friction element in the shape of the pockets 11 shown in Fig. 1. As ring 16 forms no part of the friction surfaces, it may be made of any suitable material such as fibre, and may be used as a stiffener for fabric friction rings 14 and 15. The structure shown in Figs. 4 and 5 permits the inexpensive manufacture of friction elements out of commercial sheet friction fabric or molded friction material. The three discs or rings 14, 15, and 16, may be secured together in any convenient manner instead of being riveted as illustrated.

In another type of construction, the friction element is formed of two ring-shaped discs, 18 and 19, riveted together as shown in Fig. 6 with the pockets 11 formed by two registering grooves formed in the opposite inside faces. These discs 18 and 19 may be made of fabric or fibre initially formed with grooves, and in the case of fibre, these grooves may be milled out in the faces of the plain discs, or the element may be molded in one piece 20 and pockets 11 milled out of the inner periphery as shown in Fig. 7. In these modifications, pockets 11 will preferably be of the same cross-sectional and plan shape shown in Figs. 6 and 7, respectively. Inasmuch as molded friction material is relatively stiff, it is desirable to form depressions 13 by applying pressure at either side of spokes 12, as indicated in Fig. 6.

Fig. 8 illustrates the manner of molding the friction material upon the ends of spokes 12 in the form of an integral ring 21. In this type of contsruction, depressions 13 may be molded in the friction surfaces if desired, and it is to be understood that these depressions may be at the spokes or at any other part of the friction surfaces in any one of the modifications illustrated in the drawings.

I claim:

1. A friction element comprising a spoke structure, and a substantially flat ring of friction material mounted directly on the ends of the spokes with its faces substantially parallel to the plane of the spoke structure, the said ring having a limited freedom of movement with reference to the said structure.

2. A friction element comprising a supporting member including a plurality of spokes, and a ring of friction material directly, but non-rigidly connected to the spokes.

3. A friction element consisting of a substantially flat ring of friction material formed with pockets for receiving mounting means, the said pockets extending into the ring and lying between the flat faces thereof.

4. A friction element consisting of a substantially flat annular disc of friction material formed with flat pockets for freely receiving mounting members, said pockets lying between the faces of the ring and substantially parallel to the opposite faces thereof.

5. A friction element consisting of a substantially flat ring of friction material formed with flat radial pockets for the reception of mounting members, the said pockets lying between the faces of the ring and substantially parallel to the plane thereof.

6. A friction element consisting of molded fibrous friction material of substantially flat annular form having pockets for the free reception of mounting members, the said pockets lying between the planes of the opposite faces of the annulus.

7. A friction element consisting of a plurality of flat non-rigid discs of friction material fastened together and provided with apertures formed between at least two of said discs for the reception of mounting members.

8. A friction element consisting of a ring of friction material formed with enclosed pockets opening at the inner periphery and terminating within the outer periphery for the reception of spokes.

9. A friction element comprising flat, annular, disc-like laminations of non-rigid friction material secured together with their flat faces in contact, said faces being shaped to provide pockets for receiving mounting members.

10. A friction element comprising a spoke structure, and superimposed rings of friction material secured together against opposite faces of the spokes.

11. A friction element comprising a spoke structure, and superimposed rings of friction material mounted on the spokes and secured together between the spokes.

12. A friction element consisting of a ring of friction material having enclosed pockets adapted to receive radial spokes and having surface depressions at the spokes.

13. A friction element consisting of a ring of friction material having recesses formed therein for the reception of spokes, the disc having decreased thickness at the spokes.

14. A friction element consisting of a ring-shaped disc of friction material, having radial channels for receiving the ends of spokes, said disc having a decreased thickness at the spoke channels.

15. A friction element comprising superimposed discs of friction material, flexible material forming pockets between the discs, and means for uniting the whole.

16. A friction element comprising superimposed discs of friction material, a plurality of spaced disc sectors disposed between the discs so as to provide pockets between them, and means for fastening the discs together.

17. A friction element comprising superimposed discs, a separator disc between the discs, said separator disc being shaped to form spaced pockets between the discs, and means for securing the discs together.

18. A friction element comprising superimposed discs of friction material, a disc of stiffening material between the friction discs, spoke pockets in the stiffening disc and means for fastening the whole together.

19. A friction element comprising a spoke structure and a substantially flat annular disc of friction material mounted directly on the ends of the spokes but without rigid mechanical connection thereto.

20. A friction element comprising a spoke structure, a pair of substantially flat annular discs of friction material mounted on the ends of the spokes, the plane of the discs being substantially parallel to the plane of the spokes and the discs having channels in their opposed faces in which the ends of the spokes are received.

21. A friction element comprising a substantially flat ring of friction fabric woven with pockets for receiving mounting members, said pockets lying between the faces of the ring and substantially parallel thereto.

22. A friction element comprising a substantially flat multi-ply fabric ring formed with pockets, said pockets lying between at least two plies of said ring and substantially parallel to the opposite faces thereof.

In testimony whereof I affix my signature.

WILLIAM C. FISHER.